US012593078B2

(12) United States Patent
Zheng et al.

(10) Patent No.: US 12,593,078 B2
(45) Date of Patent: Mar. 31, 2026

(54) LIVE VIDEO PLAYBACK

(71) Applicant: Shanghai Bilibili Technology Co., Ltd., Shanghai (CN)

(72) Inventors: Nanling Zheng, Shanghai (CN); Keqing Bao, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 61 days.

(21) Appl. No.: 18/585,818

(22) Filed: Feb. 23, 2024

(65) Prior Publication Data

US 2024/0196024 A1 Jun. 13, 2024

Related U.S. Application Data

(63) Continuation of application No. PCT/CN2022/099262, filed on Jun. 16, 2022.

(30) Foreign Application Priority Data

Nov. 4, 2021 (CN) .......................... 202111301198.3

(51) Int. Cl.
*H04N 21/2187* (2011.01)
*H04N 21/2343* (2011.01)
(Continued)

(52) U.S. Cl.
CPC ..... *H04N 21/2187* (2013.01); *H04N 21/2343* (2013.01); *H04N 21/47217* (2013.01); *H04N 21/8456* (2013.01)

(58) Field of Classification Search
CPC .......... H04N 21/2187; H04N 21/2343; H04N 21/47217; H04N 21/8456;
(Continued)

(56) References Cited

U.S. PATENT DOCUMENTS 10,582,232 B1 * 3/2020 Rundle .............. H04N 21/8456
2017/0195613 A1 * 7/2017 Yang ...................... H04N 5/268
(Continued)

FOREIGN PATENT DOCUMENTS

CN 103607657 A 2/2014
CN 105049931 A 11/2015
(Continued)

OTHER PUBLICATIONS

English translation version of CN 113126839 B (Year: 2023).*
(Continued)

*Primary Examiner* — Gigi L Dubasky
(74) *Attorney, Agent, or Firm* — MCANDREWS HELD & MALLOY, LTD

(57) ABSTRACT

This application provides a live video playback method. The live video playback method includes: generating a specified player when a user trigger operation is detected; obtaining a target live video file supported by the specified player, where the target live video file is obtained by performing format conversion on an initial live video file, and where the initial live video file is obtained from a content delivery server; and playing the target live video file in the specified player, where a playback state of the specified player is floating playback.

16 Claims, 5 Drawing Sheets

(51) Int. Cl.
　　*H04N 21/472* (2011.01)
　　*H04N 21/845* (2011.01)
(58) Field of Classification Search
　　CPC ......... H04N 21/26258; H04N 21/4316; H04N
　　　　　　　　21/440218; H04N 21/440245
　　See application file for complete search history.

(56) References Cited

U.S. PATENT DOCUMENTS

| | | | |
|---|---|---|---|
| 2017/0195744 | A1 | 7/2017 | Engel et al. |
| 2020/0107050 | A1* | 4/2020 | Peng .................... H04L 65/611 |

FOREIGN PATENT DOCUMENTS

| | | | | |
|---|---|---|---|---|
| CN | 105812833 | A | 7/2016 | |
| CN | 105872572 | A | 8/2016 | |
| CN | 108494792 | A | 9/2018 | |
| CN | 109246466 | A | 1/2019 | |
| CN | 109936768 | A | 6/2019 | |
| CN | 110324693 | A | 10/2019 | |
| CN | 112954396 | A | 6/2021 | |
| CN | 113126839 | A | 7/2021 | |
| CN | 113923502 | A | 1/2022 | |
| CN | 113126839 | B * | 6/2023 | ............ G06F 9/451 |
| WO | 0036826 | A1 | 6/2000 | |

OTHER PUBLICATIONS

International Search Report with a mailing date of Aug. 31, 2021, in International application No. PCT/CN2022/099262, filed on Jun. 16, 2022.

\* cited by examiner

LIVE VIDEO PLAYBACK

CROSS-REFERENCE TO RELATED APPLICATION

The present application is a continuation under 35 U.S.C. 111(a) of PCT International Application No. PCT/CN2022/099262, filed on Jun. 16, 2022, which claims priority to Chinese Patent Application No. 202111301198.3, filed on Nov. 4, 2021, the entire contents of which are hereby incorporated by reference in their entirety for all purposes.

TECHNICAL FIELD

This application relates to the field of computer technologies, and in particular, to a live video playback method. This application also relates to a computing device, and a non-transitory computer-readable storage medium.

BACKGROUND

With continuous development of computer technologies and popularization of broadband networks, livestreaming is increasingly popular worldwide as one of main content of the Internet. Livestreaming content may cover television programs, and may also cover site activities. A livestreaming capability already becomes one of necessary capabilities of an Internet company.

SUMMARY

According to a first aspect of the embodiments of this application, a method is provided, including:

generating a specified player when a user trigger operation is detected;

obtaining a target live video file supported by the specified player, where the target live video file is obtained by performing format conversion on an initial live video file, and where the initial live video file is obtained from a content delivery server; and playing the target live video file in the specified player, where a playback state of the specified player is floating playback.

According to a second aspect of the embodiments of this application, a computing device is provided, including:

one or more processors; and a memory, storing one or more programs configured to be executed by the one or more processors, the one or more programs including instructions for:

generating a specified player when a user trigger operation is detected;

obtaining a target live video file supported by the specified player, where the target live video file is obtained by performing format conversion on an initial live video file, and where the initial live video file is obtained from a content delivery server; and playing the target live video file in the specified player, where a playback state of the specified player is floating playback.

According to a third aspect of the embodiments of this application, a non-transitory computer-readable storage medium is provided. The non-transitory computer-readable storage medium stores one or more programs including instructions that, when executed by one or more processors of a computing device, cause the computing device to perform operations including:

generating a specified player when a user trigger operation is detected;

obtaining a target live video file supported by the specified player, where the target live video file is obtained by performing format conversion on an initial live video file, and where the initial live video file is obtained from a content delivery server; and playing the target live video file in the specified player, where a playback state of the specified player is floating playback.

DESCRIPTION OF EMBODIMENTS

Figure 1:
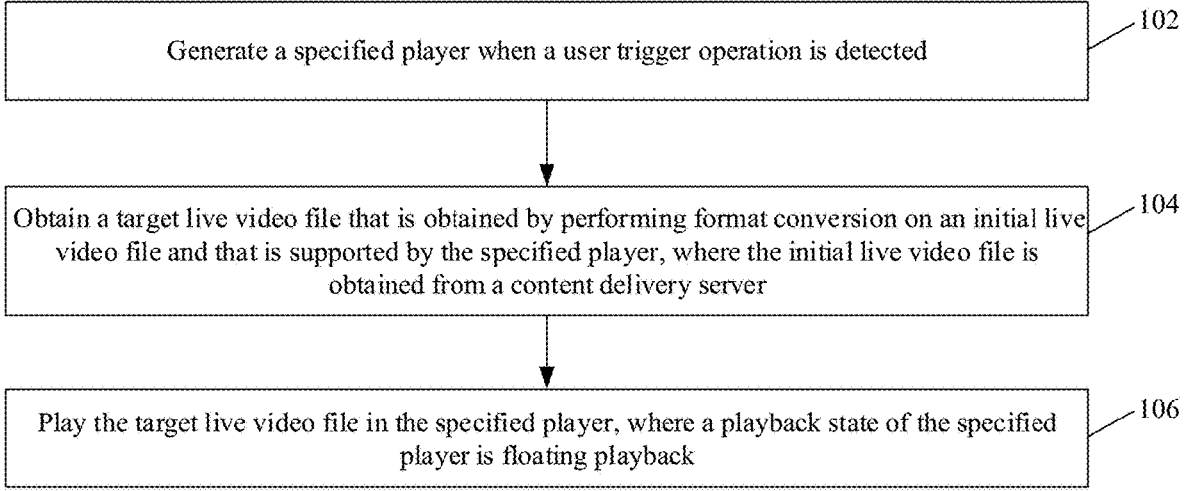
FIG. 1 is a flowchart of a live video playback method according to some embodiments of this application.

Many specific details are described in the following descriptions to facilitate full understanding of this application. However, this application can be implemented in many other manners different from those described herein, and a person skilled in the art can make similar promotion without departing from the connotation of this application. Therefore, this application is not limited by specific implementations disclosed below.

Terms used in one or more embodiments of this application are merely for the purpose of describing a specific embodiment, and are not intended to limit the one or more embodiments of this application. The terms "a" and "the" that are in singular forms and that are used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are merely used to distinguish between information of a same type. For example, without departing from the scope of one or more embodiments of this application, "first" may also be referred to as "second", and similarly, "second" may also be referred to as "first". Depending on the context, for example, the word "if" used herein can be interpreted as "while", "when", or "in response to determining".

Terms used in one or more embodiments of this application are explained first.

Hyper text transfer protocol-flash video (HTTP-FLV): refers to a protocol used to encapsulate audio and video data into a format of a flash video (FLV) and then transmit the flash video to a client by using a hyper text transfer protocol (HTTP), that is, an Internet video streaming protocol used to transmit an FLV file in an HTTP long connection manner. A video coding format is usually advanced video coding (AVC) or high efficiency video coding (HEVC). An audio coding format is usually advanced audio coding (AAC) or high efficiency advanced audio coding (HE-AAC). An advantage of HTTP-FLV is a fast livestreaming start speed, but disadvantages are that HTTP-FLV is greatly affected by a network transmission speed, and once a long connection is interrupted due to network switching, playback is also interrupted.

Real time message protocol (RTMP): is a livestreaming push protocol used in combination with HTTP-FLV, and is mainly used by a livestreaming client to push a video stream to a server.

HTTP live streaming (HLS): refers to an Internet streaming playback protocol. HLS refers to a streaming transmission protocol for slicing video data into a plurality of small fragment files. Usually, the video data includes a periodically updated plain text file (an M3U8 list file) and a plurality of sequentially sliced TS or M4S data slice files. When network switching is interrupted, an interrupted slice may be quickly pulled again to ensure uninterrupted playback. HLS supports a plurality of video coding formats such as advanced video coding (AVC) and high efficiency video coding (HEVC) and a plurality of audio coding formats such as advanced audio coding (AAC) and high efficiency advanced audio coding (HE-AAC).

AV player: is a video player built in an iOS system and a macOS system, and provides extremely smooth playback experience. However, the AV player does not support an FLV live stream video format, but supports only an HLS live stream video format.

Picture-in-picture playback: namely, "playback in a small desktop window", refers to separating a video picture played in a specific application into an independent window for continuous playback. In a process of window separation and window recovery, playback is continuous and smooth without interruption.

The inventor of the present application finds that in existing livestreaming, a user can watch livestreaming by using a livestreaming application provided by a client. However, if the user temporarily switches to another application provided by the client, for example, when the user receives an SMS message sent by another user in a livestreaming watching process, the user needs to temporarily enable an application corresponding to the SMS message for checking. In this case, a live window of the livestreaming application is closed. Consequently, livestreaming is interrupted, and the user cannot continue to watch livestreaming. When the user needs to continue to watch livestreaming, the user needs to return to the livestreaming application again. Because livestreaming is performed in a real-time mode, the user misses livestreaming content of a time period in which the user exits the livestreaming application. Therefore, an effective solution is urgently required to resolve the foregoing problem.

According to the live video playback method provided in this application, the specified player is generated when the user trigger operation is detected; the target live video file that is obtained by performing format conversion on the initial live video file and that is supported by the specified player is obtained, where the initial live video file is obtained from the content delivery server; and the target live video file is played in the specified player, where the playback state of the specified player is floating playback. The initial live video file is converted into the target live video file supported by the specified player, and the target live video file is played in the specified player. In this way, a live video is played by using the specified player, and because the specified player provides picture-in-picture playback, floating playback of the live video is implemented, thereby improving user experience. In addition, because the initial live video file is converted into the target live video file supported by the specified player, time and steps for format conversion are reduced, and disk space is saved.

This application provides a live video playback method. This application also relates to a live video playback apparatus, a computing device, a computer-readable storage medium, and a computer program, which are described in detail in the following embodiments one by one.

FIG. 1 is a flowchart of a live video playback method according to some embodiments of this application. The method includes the following steps.

Step 102: Generate a specified player when a user trigger operation is detected.

In some embodiments, the user trigger operation is an operation that a user returns back to a desktop of a client or temporarily switches to another application when the user watches livestreaming content in a livestreaming application on the client; the specified player is a player with a picture-in-picture playback function, for example, a video player AV player built in an iOS system and a macOS system; and picture-in-picture playback refers to separating a video picture played in a specific application into an independent window for continuous playback. In a process of window separation and window recovery, playback is continuous and smooth without interruption, that is, floating playback is implemented.

In actual application, when the user enables the specific livestreaming application in the client, the user watches a live video by using the livestreaming application. When the user returns back to the desktop of the client or switches to the another application and does not disable the livestreaming application, the user trigger operation is generated, that is, the user trigger operation is detected. In this case, the specified player with the picture-in-picture playback function is generated in the client.

For example, the user enables livestreaming of a specific game online streamer by using the livestreaming application downloaded in a mobile phone. When the user receives, by using the mobile phone, a message sent by a friend by using a chat application, the user enables the chat application to check the message sent by the friend when the livestreaming application is not disabled. In this case, the user trigger operation is detected, and the specified player with the picture-in-picture playback function is generated.

Step 104: Obtain a target live video file that is obtained by performing format conversion on an initial live video file and that is supported by the specified player, where the initial live video file is obtained from a content delivery server.

Further, on the basis of generating the specified player, the target live video file that is obtained by performing format conversion on the initial live video file and that is supported by the specified player is obtained.

In some embodiments, the content delivery server is a content delivery network (CDN) server, is constructed based on an IP network, and provides content delivery and service based on an efficiency requirement, a quality requirement, and a content sequence of content access and application. The target live video file is a live video file in a streaming media format, for example, an FLV format. The initial live video file is a live video file obtained from the content delivery server.

In actual application, when an online streamer performs livestreaming, a client of an online streamer terminal generates the initial live video file, and transmits the initial live video file to a streaming server (RTMP server) of a livestreaming platform by using a real time message protocol. Then, the streaming server forwards the initial live video file to a cloud video server, that is, the content delivery server, by using the real time message protocol or HTTP-FLV. After the specified player is generated, the client requests the initial live video file from the content delivery server by using a proxy means, that is, the content delivery server sends the initial live video file to the client by using a hyper text transfer protocol, and the client converts, by using the proxy means, the initial live video file into the target live video file supported by the specified player.

Figure 2A:
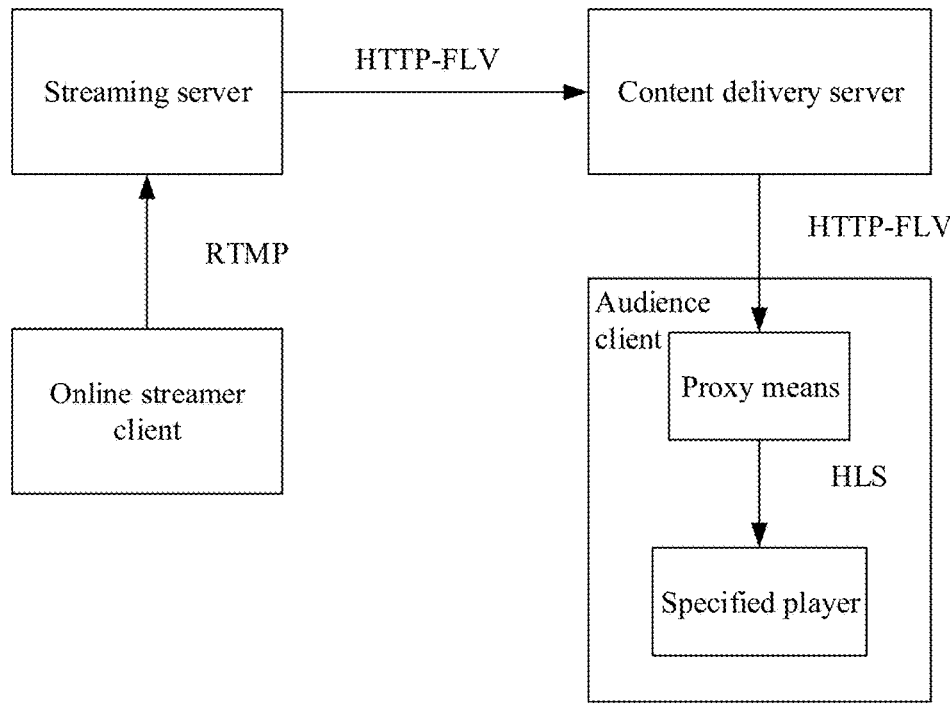
FIG. 2A is a schematic diagram of a livestreaming procedure according to some embodiments of this application.

FIG. 2A is a schematic diagram of a livestreaming procedure according to some embodiments of this application. An online streamer performs livestreaming, and a client of the online streamer transmits a generated FLV file, that is, the initial live video file, to the streaming server of the livestreaming platform by using the RTMP protocol. Then, the streaming server forwards the initial live video file to the content delivery server by using HTTP-FLV. Then, the content delivery server sends the initial live video file to a proxy means of an audience client.

It should be noted that, after the specified player is generated, the specified player triggers a request for continuing to play a live video, namely, a livestreaming request. After that, the client may obtain the initial live video file from the content delivery server based on the livestreaming request triggered by the specified player. The livestreaming request is a request generated when specific livestreaming is watched by using the specified player.

In addition, the livestreaming request may carry a livestreaming identifier. To improve accuracy and efficiency of livestreaming, the initial live video file may be obtained from the content delivery server based on the livestreaming identifier. To be specific, when the livestreaming request carries the livestreaming identifier, a specific implementation process of obtaining the initial live video file from the content delivery server based on the livestreaming request triggered by the specified player may be as follows:

determining the content delivery server corresponding to the livestreaming identifier based on the livestreaming identifier; and obtaining the initial live video file from the content delivery server.

In some embodiments, the livestreaming identifier is an identifier corresponding to livestreaming that the user needs to watch, and may be an address used to be mapped to a specific content delivery server to obtain the initial live video file, or may be a name of the livestreaming that the user needs to watch.

In actual application, after the livestreaming request is triggered by the specified player, a content delivery server corresponding to a live video to be played in the specified player, that is, the content delivery server corresponding to the livestreaming identifier, is determined based on the livestreaming identifier in the livestreaming request. Further, the client may obtain a file corresponding to to-be-played live video, that is, the initial live video file, from the content delivery server by using the proxy means.

For example, if the livestreaming identifier carried in the livestreaming request is an address, a content delivery server indicated by the address is determined as a target content delivery server. Then, the client obtains the initial live video file from the target content delivery server by using the proxy means.

It should be noted that, when being initialized, the proxy means enables a built-in submeans that monitors a local IP address (for example, 127.0.0.1) and a port (for example, 8000), and the livestreaming application may set a playback address for the specified player, for example, http://127.0.0.1:8000/stream_name/index.m3u8. When the specified player loads the playback address, that is, when the user watches livestreaming, the built-in submeans of the proxy means receives the livestreaming request that carries "stream_name/index.m3u8" and that is sent by the specified player, where "stream_name" is an address used by the proxy means to obtain the initial live video file from a specific content delivery server.

On the basis of obtaining the initial live video file from the content delivery server based on the livestreaming request, the initial live video file needs to be converted into the target live video file supported by the specified player. That is, before the target live video file that is obtained by performing format conversion on the initial live video file and that is supported by the specified player is obtained, the initial live video file needs to be converted into the target live video file supported by the specified player.

In some embodiments, the initial live video file may be converted into an HTTP live streaming format, for example, an HLS format. The target live video file is a live video file that can be played in the specified player.

In actual application, after the initial live video file is obtained, because the specified player supports playback of only a file in a specific format, format conversion needs to be performed on the initial live video file, to obtain the target live video file supported by the specified player.

For example, the specified player supports playback of only a file in the HLS format, and a format of the initial live video file is the FLV format. In this case, the initial live video file in the FLV format needs to be converted into a file in the HLS format to obtain the target live video file in the HLS format.

In addition, because the target live video file obtained through direct format conversion is excessively large, loading time of the specified player is excessively long, causing a slow livestreaming start speed of the specified player. Therefore, slicing and format conversion may be performed on the initial live video file. The initial live video file is converted into the target live video file supported by the specified player. To be specific, before the obtaining a target live video file that is obtained by performing format conversion on an initial live video file and that is supported by the specified player, the method further includes:

performing slicing and format conversion processing on the initial live video file to obtain at least one target live video slice file supported by the specified player, where the at least one target live video slice file constitutes the target live video file.

In some embodiments, slicing refers to a process of slicing a live video file with long playback time into a plurality of live video file slices with short playback time. For example, when playback duration of a live video file is 20 minutes, the live video file may be sliced into 20 live video file slices whose playback duration are 1 minute.

In actual application, slicing processing may be performed on the initial live video file first to obtain at least one initial live video slice file, and then format conversion processing is performed on initial live video slice files to obtain the at least one target live video slice file supported by the specified player. Alternatively, format conversion processing may be performed on the initial live video file first to obtain the target live video file supported by the specified player, and then slicing processing is performed on the target live video file supported by the specified player to obtain the at least one target live video slice file supported by the specified player. Alternatively, slicing and format conversion processing may be performed on the initial live video file simultaneously to obtain the at least one target live video slice file supported by the specified player.

In the foregoing example, slicing processing is directly performed on video and audio data packets in the initial live video file in the FLV format without decoding. To be specific, the video and audio data packets are reassembled into at least one m4s slice file that is in a Fragment-MP4 format and whose playback duration does not exceed 0.5 seconds, to obtain at least one target live video slice file in the HLS format.

Step 106: Play the target live video file in the specified player, where a playback state of the specified player is floating playback.

Further, on the basis of obtaining the target live video file that is obtained by performing format conversion on the initial live video file and that is supported by the specified player, the target live video file is played in the specified player.

In some embodiments, floating playback refers to continuous playback in a small window independently covering and played on a display interface of a client, namely, picture-in-picture playback.

In actual application, the target live video file needs to be transmitted to the specified player after being obtained, and the live video is played in the specified player in the playback state of floating playback, that is, the target live video file is played.

As shown in FIG. 2A, after converting the received initial live video file into the target live video file, the proxy means sends the target live video file to the specified player by using HTTP live streaming (HLS), and the specified player plays the target live video file in the playback state of floating playback.

In one or more implementations of the embodiments, slicing and format conversion processing may be performed on the initial live video file to obtain the at least one target live video slice file supported by the specified player. In this case, to further improve livestreaming efficiency and increase the livestreaming start speed, a target playlist file may be first generated based on attribute information of the target live video slice files, then a slice file obtaining request is generated in the specified player based on the target playlist file, and the target live video slice files corresponding to the slice file obtaining request are returned to the specified player. To be specific, before the playing the target live video file in the specified player, the method further includes:

obtaining attribute information of target live video slice files in the target live video file, and generating a target playlist file based on the attribute information of the target live video slice files; and generating a slice file obtaining request in the specified player based on the attribute information of the target live video slice files in the target playlist file.

Further, implementation processes of playing the target live video file in the specified player may be as follows:

playing the at least one target live video slice file in the specified player based on the slice file obtaining request.

In some embodiments, the attribute information is information related to properties of the target live video slice files, for example, information such as playback duration and file names of the target live video slice files; the target playlist file refers to a slice file list, that is, a list that can be used by the specified player to directly parse and obtain the attribute information of the target live video slice files, for example, an M3U8 list file; and the slice file obtaining request is a request generated by the specified player to obtain a specific target live video slice file.

In actual application, after the at least one target live video slice file is obtained, the playback duration and the file names of the target live video slice files may be obtained by using the proxy means, and then the playback duration and the file names of the target live video slice files are saved in one playlist file to obtain the target playlist file. Then, the specified player parses the target playlist file to obtain the playback duration and the file names of the target live video slice files, to generate the slice file obtaining request. The specified player plays the at least one target live video slice file based on the slice file obtaining request.

For example, the client obtains six target live video slice files by using the proxy means, then obtains playback duration and file names of the six target live video slice files. As shown in Table 1, the playback duration of each of the target live video slice files is 0.5 seconds, that is, 0.5 s; and the file name of the first target live video slice file is "h1.m4s", the file name of the second target live video slice file is "8.m4s", the file name of the third target live video slice file is "9.m4s", the file name of the fourth target live video slice file is "10.m4s", the file name of the fifth target live video slice file is "11.m4s", and the file name of the sixth target live video slice file is "12.m4s".

TABLE 1

| Playback duration and file names of the target live video slice files | | | | | | |
|---|---|---|---|---|---|---|
| Target live video slice file | First | Second | Third | Fourth | Fifth | Sixth |
| Playback duration | 0.5 s | 0.5 s | 0.5 s | 0.5 s | 0.5 s | 0.5 s |
| File name | h1.m4s | 8.m4s | 9.m4s | 10.m4s | 11.m4s | 12.m4s |

Then, the playback duration and the file names of the target live video slice files are saved in the M3U8 list file to obtain a target M3U8 list file, that is, the target playlist file, as follows:

```
#EXTM3U
#EXT-X-VERSION: 7
#EXT-X-START: TIME-OFFSET=0
#EXT-X-TARGETDURATION: 0.5
#EXT-X-MAP: URI="h1.m4s"
#EXT-X-MEDIA-SEQUENCE: 8
#EXTINF: 0.5,
8.m4s
#EXTINF: 0.5,
9.m4s
#EXTINF: 0.5,
10.m4s
#EXTINF: 0.5,
11.m4s
#EXTINF: 0.5,
12.m4s
```

Then, the proxy means of the client sends the target playlist file to the specified player. The specified player parses the target playlist file to obtain the playback duration and the file names of the six target live video slice files, and then generates the slice file obtaining request and sends the slice file obtaining request to the proxy means. The proxy means sends the six target live video slice files to the specified player, so that the specified player plays the live video.

It should be noted that, to improve performance and reduce impact on a storage of the client when the target live video slice files are read and written, these target live video slice files are merely virtual files in a memory data block format, and are not stored in a physical permanent storage of the mobile phone.

In addition, to ensure that livestreaming is not distorted, that is, coherence and correctness of a picture of the live video, when the target playlist file is generated, the attribute information of the target live video slice files needs to be added in a specific sequence to generate the target playlist file. To be specific, implementation processes of generating the target playlist file based on the attribute information of the target live video slice files may be as follows:

adding the attribute information of the target live video slice files to a preset initial playlist file in a slice sequence, to obtain the target playlist file.

In some embodiments, the initial playlist file refers to a playlist in which the attribute information of the target live video slice files is not filled in.

In actual application, the specified player plays the live video in an arrangement sequence of the attribute information of the target live video slice files in the target playlist file. To ensure correctness of the live video, correctness of the arrangement sequence of the attribute information of the target live video slice files needs to be ensured. Therefore, when the target playlist file is generated, the attribute information of the target live video slice files needs to be added to the initial playlist file in a sequence of the target live video slice files, that is, the slice sequence, to obtain the target playlist file.

In the foregoing example, if the slice sequence is the first target live video slice file, the second target live video slice file, the third target live video slice file, the fourth target live video slice file, the fifth target live video slice file, and the sixth target live video slice file, the playback duration and the file names of the target live video slice files are added to the initial playlist file from the first target live video slice file to the sixth target live video slice file, to obtain the target playlist file.

In one or more implementations of the embodiments, to increase the livestreaming start speed of the specified player, the specified player generates, in the sequence of the attribute information of the target live video slice files in the target playlist file, slice file obtaining subrequests for the target live video slice files one by one, and then the client or the proxy means of the client returns, based on a received slice file obtaining subrequest, a corresponding target live video slice file to the specified player. To be specific, implementation processes of generating the slice file obtaining request in the specified player based on the attribute information of the target live video slice files in the target playlist file may be as follows:

generating, starting from the first target live video slice file in the target playlist file, a current slice file obtaining subrequest in the specified player based on attribute information of a current target live video slice file in the target playlist file, where the target live video slice file is in a one-to-one correspondence with the slice file obtaining subrequest.

Correspondingly, the playing the at least one target live video slice file in the specified player based on the slice file obtaining request includes:

playing the current target live video slice file in the specified player based on the current slice file obtaining subrequest.

In actual application, after receiving the target playlist file, parsing the target playlist file, and determining the attribute information of the target live video slice files, the specified player first generates a first slice file obtaining subrequest based on the attribute information of the first target live video slice file, and sends the first slice file obtaining subrequest to the proxy means; then generates a second slice file obtaining subrequest based on the attribute information of the second target live video slice file, and sends the second slice file obtaining subrequest to the proxy means; and so on. In addition, when receiving the first slice file obtaining subrequest, the proxy means sends the first target live video slice file to the specified player, and the specified player plays the first target live video slice file; when receiving the second slice file obtaining subrequest, the proxy means sends the second target live video slice file to the specified player; and so on.

In the foregoing example, after parsing the attribute information of the six target live video slice files in the target M3U8 list, the specified player generates "http://127.0.0.1:8000/stream_name/h1.m4s", that is, the first slice file obtaining subrequest, based on "#EXT-X-TARGETDURA-TION: 0.5" and "#EXT-X-MAP: URI="h1.m4s", and sends the first slice file obtaining subrequest to means; generates the proxy "http://127.0.0.1:8000/stream_name/8.m4s", that is, the second slice file obtaining subrequest, based on "#EXTINF: 0.5, 8.m4s", and sends the second slice file obtaining subrequest to the proxy means; . . . ; and generates "http://127.0.0.1:8000/stream_name/12.m4s", that is, the six slice file obtaining subrequest, based on "#EXTINF: 0.5, 12.m4s", and sends the six slice file obtaining subrequest to the proxy means. In addition, the proxy means sends the first target live video slice file to the specified player based on the first slice file obtaining subrequest, and the specified player plays the first target live video slice file; the proxy means sends the second target live video slice file to the specified player based on the second slice file obtaining subrequest, and the specified player plays the second target live video slice file; . . . ; and the proxy means sends the sixth target live video slice file to the specified player based on the sixth slice file obtaining subrequest, and the specified player plays the sixth target live video slice file.

In some embodiments, to further increase the livestreaming start speed of the specified player, a specified playlist file may be first sent to the specified player, and the proxy means performs slicing and format conversion processing on the initial live video file based on the specified playlist file. In this way, time for generating the specified playlist file is reduced, and livestreaming efficiency is further improved. To be specific, before the performing slicing and format conversion processing on the initial live video file to obtain at least one target live video slice file supported by the specified player, the method further includes:

pre-generating a specified playlist file, where the specified playlist file includes attribute information of at least one specified live video slice file.

Correspondingly, the performing slicing and format conversion processing on the initial live video file to obtain at least one target live video slice file supported by the specified player includes:

performing slicing and format conversion processing on the initial live video file based on the attribute information of the at least one specified live video slice file in the specified playlist file, to generate the at least one specified live video slice file that is in a one-to-one correspondence with the attribute information of the at least one specified live video slice file and that is supported by the specified player.

In some embodiments, the attribute information is information related to properties of the target live video slice files, for example, information such as playback duration and file names of the target live video slice files; and the specified playlist file refers to a slice file list, that is, a list that can be used by the specified player to directly parse and obtain the attribute information of the specified live video slice files, for example, an M3U8 list file.

In actual application, to increase the livestreaming start speed of the specified player, the specified playlist file may be first sent to the specified player, where the specified live video slice files corresponding to the attribute information in the specified playlist file have not been generated. Then, the proxy means performs slicing and format conversion processing on the initial live video file based on the attribute information of the at least one specified live video slice file in the specified playlist file, to generate the at least one specified live video slice file in a one-to-one correspondence with the attribute information.

As shown in Table 2, the specified playlist file includes attribute information of five specified live video slice files, that is, playback duration and file names, where the playback duration of each of the specified live video slice files is 0.8 s; and the file name of the first specified live video slice file is "h2.m4s", the file name of the second specified live video slice file is "3.m4s", the file name of the third specified live video slice file is "4.m4s", the file name of the fourth specified live video slice file is "5.m4s", and the file name of the fifth specified live video slice file is "6.m4s". When slicing and format conversion processing is performed on the initial live video file, the first specified live video slice file whose playback duration is 0.8 s and whose file name is h2.m4s is obtained, the second specified live video slice file whose playback duration is 0.8 s and whose file name is 3.m4s is obtained, the third specified live video slice file whose playback duration is 0.8 s and whose file name is 4.m4s is obtained, the fourth specified live video slice file whose playback duration is 0.8 s and whose file name is 5.m4s is obtained, and the fifth specified live video slice file whose playback duration is 0.8 s and whose file name is 6.m4s is obtained.

TABLE 2

| Playback duration and file names of the specified live video slice files | | | | | |
| --- | --- | --- | --- | --- | --- |
| Specified live video slice file | First | Second | Third | Fourth | Fifth |
| Playback duration | 0.8 s | 0.8 s | 0.8 s | 0.8 s | 0.8 s |
| File name | h2.m4s | 3.m4s | 4.m4s | 5.m4s | 6.m4s |

To further improve livestreaming efficiency and increase the livestreaming start speed, the proxy means receives the slice file obtaining request sent by the specified player based on the target playlist file, and returns the target live video slice files corresponding to the slice file obtaining request. To be specific, implementation processes of playing the target live video file in the specified player may be as follows:

generating a slice file obtaining request in the specified player based on the attribute information of the at least one specified live video slice file in the specified playlist file; and playing the at least one specified live video slice file in the specified player based on the slice file obtaining request.

In some embodiments, the slice file obtaining request is a request generated by the specified player to obtain a specific specified live video slice file.

In actual application, after obtaining the specified playlist file, the specified player needs to parse the specified playlist file, obtain the playback duration and the file names of the specified live video slice files, then generate the slice file obtaining request, and send the slice file obtaining request to the proxy means of the client. The client sends the at least one specified live video slice file to the specified player based on the slice file obtaining request by using the proxy means, that is, the at least one specified live video slice file is played in the specified player.

In one or more implementations of the embodiments, to increase the livestreaming start speed of the specified player, the specified player generates, in a sequence of the attribute information of the specified live video slice files in the specified playlist file, slice file obtaining subrequests for the specified live video slice files one by one, and then the proxy means of the client returns, based on a received slice file obtaining subrequest, a corresponding specified live video slice file to the specified player. To be specific, when the slice file obtaining request includes at least one slice file obtaining subrequest, implementation processes of generating the slice file obtaining request in the specified player based on the attribute information of the at least one specified live video slice file in the specified playlist file may be as follows:

generating, starting from the first specified live video slice file in the specified playlist file, a current slice file obtaining subrequest in the specified player based on attribute information of a current specified live video slice file in the specified playlist file, where the specified live video slice file is in a one-to-one correspondence with the slice file obtaining subrequest.

Correspondingly, the playing the at least one specified live video slice file in the specified player based on the slice file obtaining request includes:

playing the current specified live video slice file in the specified player based on the current slice file obtaining subrequest.

In actual application, after receiving the specified playlist file, parsing the specified playlist file, and determining the attribute information of the specified live video slice files, the specified player first generates a first slice file obtaining subrequest based on the attribute information of the first specified live video slice file, and sends the first slice file obtaining subrequest to the proxy means; then generates a second slice file obtaining subrequest based on the attribute information of the second specified live video slice file, and sends the second slice file obtaining subrequest to the proxy means; and so on. In addition, when receiving the first slice file obtaining subrequest, the proxy means sends the first specified live video slice file to the specified player, and the specified player plays the first specified live video slice file;

when receiving the second slice file obtaining subrequest, the proxy means sends the second specified live video slice file to the specified player, and the specified player plays the second specified live video slice file; and so on.

In the foregoing example, after parsing the attribute information of the five specified live video slice files in the specified playlist file, the specified player generates "http://127.0.0.1:8000/stream_name/h2.m4s", that is, the first slice file obtaining subrequest, based on the file name "h2.m4s" and the play duration "0.8 s" of the first specified live video slice file, and sends the first slice file obtaining subrequest to the proxy means; generates "http://127.0.0.1:8000/stream_name/3.m4s", that is, the second slice file obtaining subrequest, based on the file name "3.m4s" and the play duration "0.8 s" of the second specified live video slice file, and sends the second slice file obtaining subrequest to the proxy means; . . . ; and generates "http://127.0.0.1:8000/stream_name/6.m4s", that is, the fifth slice file obtaining subrequest, based on the file name "6.m4s" and the play duration "0.8 s" of the fifth specified live video slice file, and sends the fifth slice file obtaining subrequest to the proxy means. In addition, the proxy means sends the first specified live video slice file to the specified player based on the first slice file obtaining subrequest, and the specified player plays the first specified live video slice file; the proxy means sends the second specified live video slice file to the specified player based on the second slice file obtaining subrequest, and the specified player plays the second specified live video slice file; . . . ; and the proxy means sends the fifth specified live video slice file to the specified player based on the fifth slice file obtaining subrequest, and the specified player plays the fifth specified live video slice file.

Figure 2B:
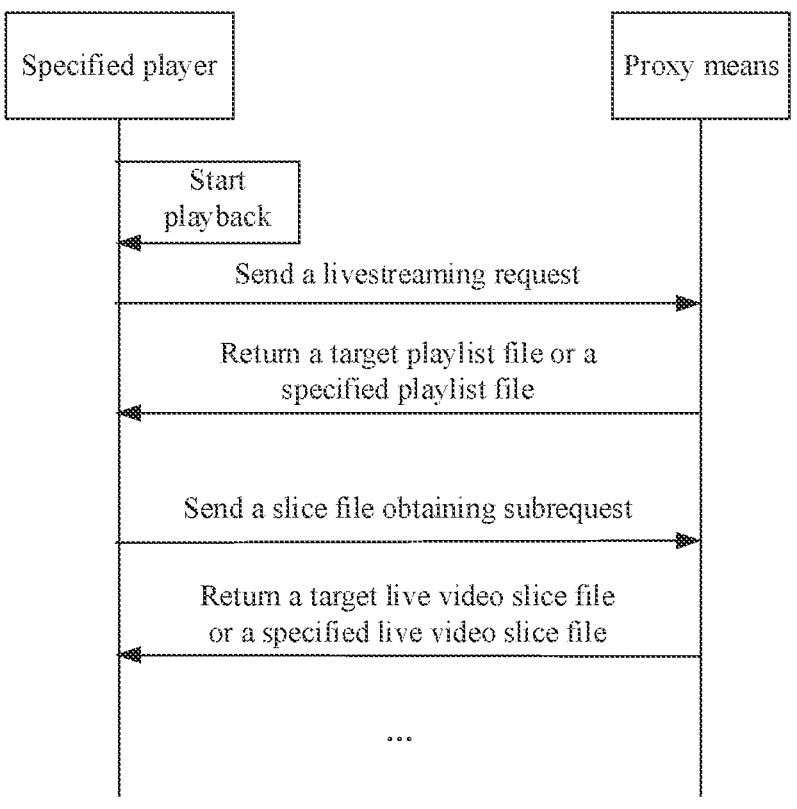
FIG. 2B is a schematic diagram of interaction between a proxy means and a specified player according to some embodiments of this application.

FIG. 2B is a schematic diagram of interaction between a proxy means and a specified player according to some embodiments of this application. When the specified player starts playback, that is, when the user trigger operation is detected and the specified player is generated, the specified player sends the livestreaming request to the proxy means, and the livestreaming request carries the playback address, that is, the livestreaming identifier. In this case, the proxy means receives a standard HTTP GET request whose path is/stream_name/index.m3u8, that is, the livestreaming request, where "stream_name" is an address used by the proxy means to obtain the initial live video file from a specific content delivery server. Then, the proxy means returns the target playlist file or the specified playlist file to the specified player in a standard HTTP response manner. After parsing the attribute information of the target live video slice files or the specified live video slice files that occur in the target playlist file or the specified playlist file, the specified player sequentially generates the slice file obtaining subrequests in an occurrence sequence of the target live video slice files or the specified live video slice files. Then, the specified player sends the slice file obtaining subrequests to the proxy means, the proxy means returns the target live video slice files or the specified live video slice files, and then the target live video slice files or the specified live video slice files are played in the specified player. In this way, the specified player indirectly initializes the initial live video files. In addition, picture-in-picture playback, that is, floating playback, can be implemented because of a characteristic of the specified player.

It should be noted that, to ensure reduction of discontinuous and freezing playback caused by a network jitter during livestreaming, the specified player requests enough specified live video slice files in advance. After specified live video slice files that can be played for 3 seconds are preloaded by default, playback actually starts. Limited to a network speed between the client and the content delivery server and a difference between live stream code rates, 1 second to 3 seconds may be required for preloading the specified live video slice files of 3 seconds. Consequently, when enabling specific livestreaming, the user sees an obvious black screen loading process. In addition, a delay of watching livestreaming also increases due to time consumed by preloading. This experience does not reach "instant playback" experience almost immediately occurring in a picture when an ordinary player directly plays the initial live video file. To increase the livestreaming start speed of the specified player, the specified player may be set, for example, the AV player is set to preferredForwardBufferDuration=0.5. In this case, the AV player needs to load only a specified live video slice file that can be played for 0.5 seconds, and then playback may start.

In addition, the specified playlist file may alternatively be prepared in advance, where the specified live video slice files corresponding to the specified playlist file may have not been generated. When the specified player parses the specified playlist file after receiving the specified playlist file, the proxy means also downloads the initial live video file from the content delivery server by using a multithreading technology, and generates the specified live video slice files that are about to be requested by the specified player and that are in a one-to-one correspondence with the attribute information in the specified playlist file. When the proxy means receives a slice file obtaining subrequest for a specific specified live video slice file, if the proxy means already obtains the specified live video slice file, the proxy means may return the specified live video slice file by using a specified protocol, for example, return the specified live video slice file to the specified player by using HTTP response; or if the proxy means does not obtain the specified live video slice file, the proxy means returns the specified live video slice file to the specified player in an asynchronous manner after obtaining the specified live video slice file. In this way, because playback duration of each specified live video slice file obtained by the proxy means does not exceed 0.5 seconds, in a normal network case, it only takes less than 0.5 seconds to generate the first specified live video slice file, which is far less than 1 second to 3 seconds. In this case, the specified player can quickly start playback, and the delay is also reduced, that is, problems that the livestreaming start speed of the specified player is slow and the delay is large are resolved.

According to the live video playback method provided in this application, the specified player is generated when the user trigger operation is detected; the target live video file that is obtained by performing format conversion on the initial live video file and that is supported by the specified player is obtained, where the initial live video file is obtained from the content delivery server; and the target live video file is played in the specified player, where the playback state of the specified player is floating playback. The initial live video file is converted into the target live video file supported by the specified player, and the target live video file is played in the specified player. In this way, the live video is played by using the specified player, and because the specified player provides picture-in-picture playback, floating playback of the live video is implemented, thereby improving user experience. In addition, because the initial live video file is converted into the target live video file supported by the specified player, time and steps for format conversion are reduced, and disk space is saved.

According to the live video playback method provided in this application, a picture and sound of the live video almost immediately occur in the specified player after the user enables specific livestreaming, thereby achieving "instant playback" experience. In addition, the proxy means may support simultaneous format conversion of a plurality of initial live video files, so that a plurality of specified players can play a plurality of different types of livestreaming simultaneously. In addition, in a process of the live video playback method provided in this application, the video or audio data in the initial live video file does not need to be decoded and recoded, and only splitting and slice reassembly are performed for the video and audio data. In this process, almost no additional central processing unit overhead is added. Compared with converting, on the server, the initial live video file into the target live video file supported by the specified player, corresponding server costs can be saved in a local stream conversion solution of the client. For a large-scale livestreaming platform, costs are saved.

Figure 2C:
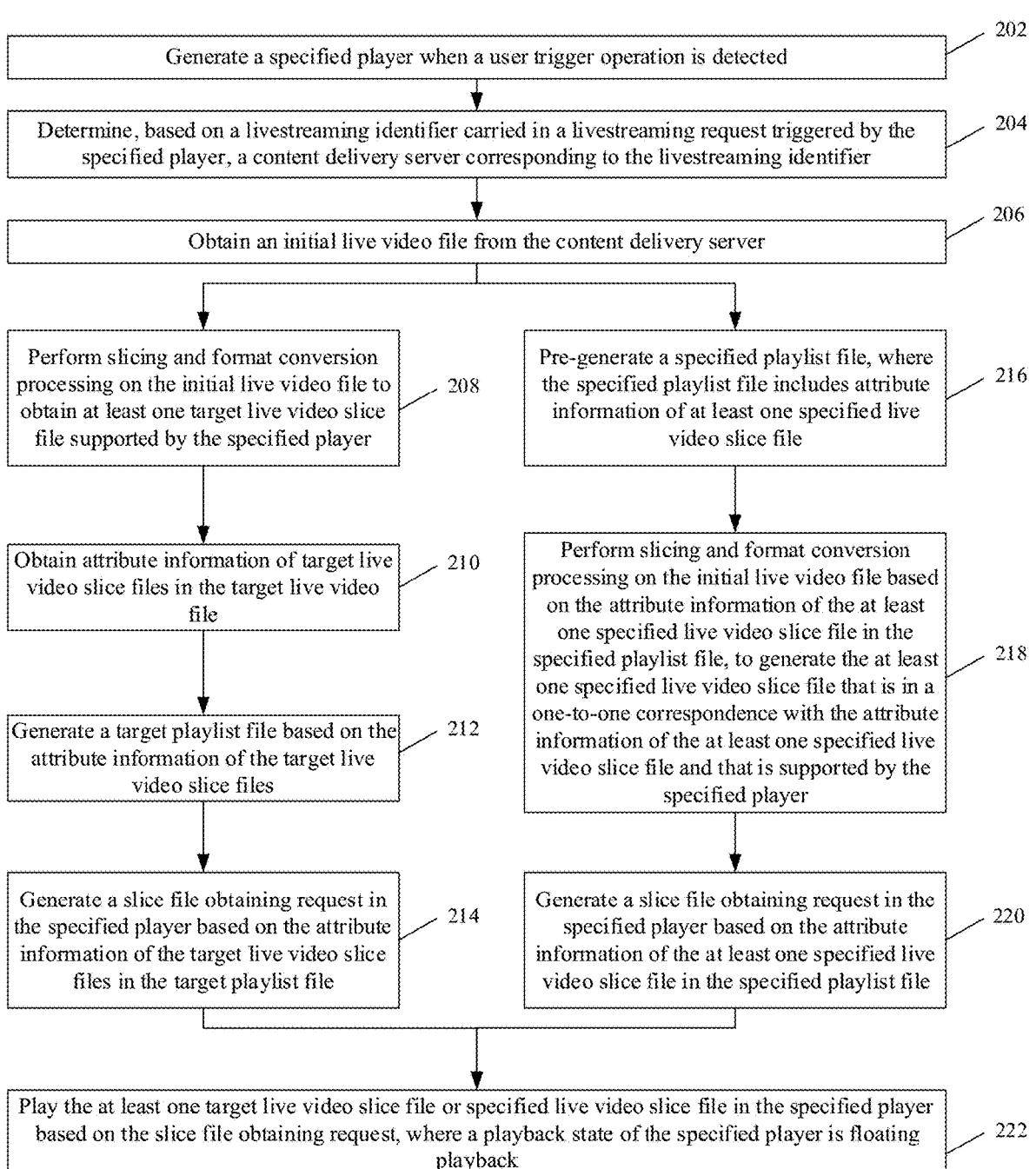
FIG. 2C is a flowchart of processing of a live video playback method applied to shopping livestreaming according to some embodiments of this application.

The following further describes the live video playback method with reference to FIG. 2C by using an example in which the live video playback method provided in this application is applied to shopping livestreaming. FIG. 2C is a flowchart of processing of a live video playback method applied to shopping livestreaming according to some embodiments of this application. The processing includes the following steps:

Step 202: Generate a specified player when a user trigger operation is detected.

Step 204: Determine, based on a livestreaming identifier carried in a livestreaming request triggered by the specified player, a content delivery server corresponding to the livestreaming identifier.

Step 206: Obtain an initial live video file from the content delivery server.

Step 208: Perform slicing and format conversion processing on the initial live video file to obtain at least one target live video slice file supported by the specified player, where the at least one target live video slice file constitutes a target live video file.

Step 210: Obtain attribute information of target live video slice files in the target live video file.

Step 212: Generate a target playlist file based on the attribute information of the target live video slice files.

In some embodiments, the generating a target playlist file based on the attribute information of the target live video slice files includes:

adding the attribute information of the target live video slice files to a preset initial playlist file in a slice sequence, to obtain the target playlist file.

Step 214: Generate a slice file obtaining request in the specified player based on the attribute information of the target live video slice files in the target playlist file.

In some embodiments, the slice file obtaining request includes at least one slice file obtaining subrequest.

The generating a slice file obtaining request in the specified player based on the attribute information of the target live video slice files in the target playlist file includes:

generating, starting from the first target live video slice file in the target playlist file, a current slice file obtaining subrequest in the specified player based on attribute information of a current target live video slice file in the target playlist file, where the target live video slice file is in a one-to-one correspondence with the slice file obtaining subrequest.

Step 216: Pre-generate a specified playlist file, where the specified playlist file includes attribute information of at least one specified live video slice file.

Step 218: Perform slicing and format conversion processing on the initial live video file based on the attribute information of the at least one specified live video slice file in the specified playlist file, to generate the at least one specified live video slice file that is in a one-to-one correspondence with the attribute information of the at least one specified live video slice file and that is supported by the specified player.

Step 220: Generate a slice file obtaining request in the specified player based on the attribute information of the at least one specified live video slice file in the specified playlist file.

In some embodiments, the slice file obtaining request includes at least one slice file obtaining subrequest.

The generating a slice file obtaining request in the specified player based on the attribute information of the at least one specified live video slice file in the specified playlist file includes:

generating, starting from the first specified live video slice file in the specified playlist file, a current slice file obtaining subrequest in the specified player based on attribute information of a current specified live video slice file in the specified playlist file, where the specified live video slice file is in a one-to-one correspondence with the slice file obtaining subrequest.

It should be noted that step 208 to step 214 and step 216 to step 220 are two parallel methods, and may be selected based on an actual requirement.

Step 222: Play the at least one target live video slice file or specified live video slice file in the specified player based on the slice file obtaining request, where a playback state of the specified player is floating playback.

Based on the current slice file obtaining subrequest, the current target live video slice file is played in the specified player or the current specified live video slice file is sent to the specified player.

According to the live video playback method applied to shopping livestreaming provided in this application, the initial live video file is converted into the target live video file supported by the specified player, and the target live video file is played in the specified player. In this way, a live video is played by using the specified player, and because the specified player provides picture-in-picture playback, floating playback of the live video is implemented, thereby improving user experience. In addition, because the initial live video file is converted into the target live video file supported by the specified player, time and steps for format conversion are reduced, and disk space is saved.

Figure 3:
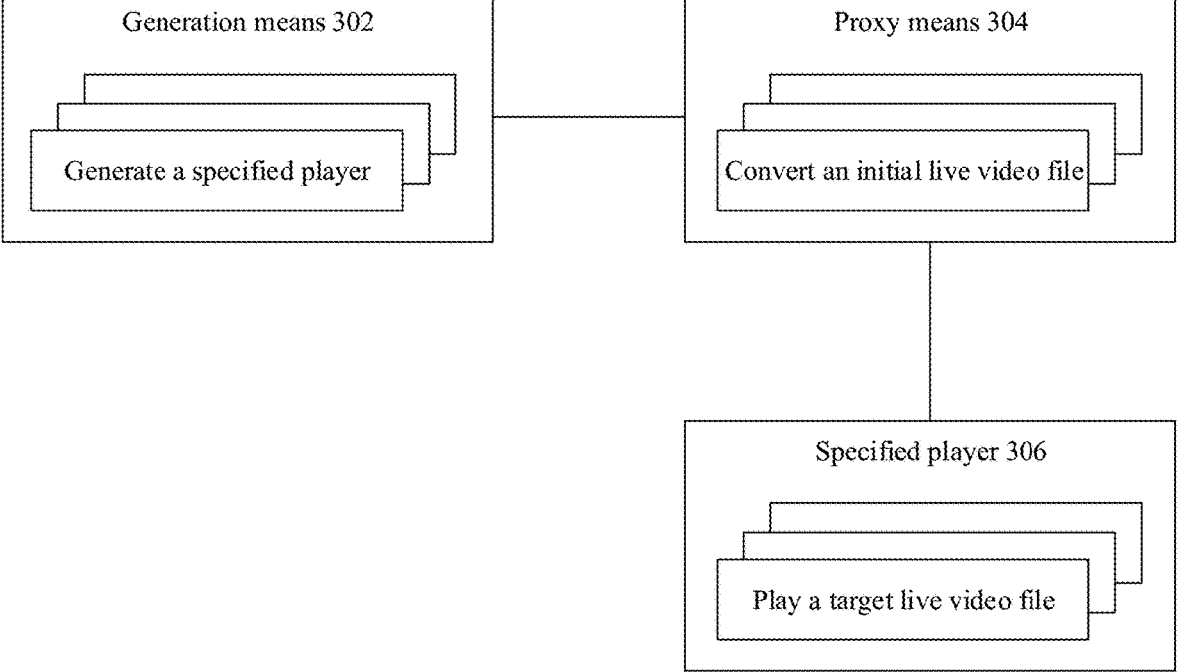
FIG. 3 is a schematic diagram of a structure of a live video playback apparatus according to some embodiments of this application.

Corresponding to the foregoing method embodiments, this application further provides embodiments of a live video playback apparatus. FIG. 3 is a schematic diagram of a structure of a live video playback apparatus according to some embodiments of this application. As shown in FIG. 3, the apparatus includes:

a generation means 302, configured to generate a specified player when a user trigger operation is detected;

a proxy means 304, configured to obtain a target live video file that is obtained by performing format conversion on an initial live video file and that is supported by the specified player, where the initial live video file is obtained from a content delivery server; and a specified player 306, configured to play the target live video file, where a playback state of the specified player is floating playback.

In one or more implementations of the embodiments, the specified player 306 is further configured to:

perform slicing and format conversion processing on the initial live video file to obtain at least one target live video slice file supported by the specified player, where the at least one target live video slice file constitutes the target live video file.

In one or more implementations of the embodiments, the proxy means 304 is configured to:

obtain attribute information of target live video slice files in the target live video file, and generate a target playlist file based on the attribute information of the target live video slice files.

The specified player 306 is further configured to:

generate a slice file obtaining request based on the attribute information of the target live video slice files in the target playlist file; and play the at least one target live video slice file based on the slice file obtaining request.

In one or more implementations of the embodiments, the proxy means 304 is further configured to:

add the attribute information of the target live video slice files to a preset initial playlist file in a slice sequence, to obtain the target playlist file.

In one or more implementations of the embodiments, the slice file obtaining request includes at least one slice file obtaining subrequest.

The specified player 306 is further configured to:

generate, starting from the first target live video slice file in the target playlist file, a current slice file obtaining subrequest based on attribute information of a current target live video slice file in the target playlist file, where the target live video slice file is in a one-to-one correspondence with the slice file obtaining subrequest; and play the current target live video slice file based on the current slice file obtaining subrequest.

In one or more implementations of the embodiments, the specified player 306 is further configured to:

pre-generate a specified playlist file, where the specified playlist file includes attribute information of at least one specified live video slice file.

The proxy means 304 is further configured to:

perform slicing and format conversion processing on the initial live video file based on the attribute information of the at least one specified live video slice file in the specified playlist file, to generate the at least one specified live video slice file that is in a one-to-one correspondence with the attribute information of the at least one specified live video slice file and that is supported by the specified player.

In one or more implementations of the embodiments, the specified player 306 is further configured to:

generate a slice file obtaining request based on the attribute information of the at least one specified live video slice file in the specified playlist file; and play the at least one specified live video slice file based on the slice file obtaining request.

In one or more implementations of the embodiments, the slice file obtaining request includes at least one slice file obtaining subrequest.

The specified player 306 is further configured to:

generate, starting from the first specified live video slice file in the specified playlist file, a current slice file obtaining subrequest based on attribute information of a current specified live video slice file in the specified playlist file, where the specified live video slice file is in a one-to-one correspondence with the slice file obtaining subrequest; and play the current specified live video slice file based on the current slice file obtaining subrequest.

In one or more implementations of the embodiments, the proxy means 304 is further configured to:

obtain the initial live video file from the content delivery server based on a livestreaming request triggered by the specified player.

In one or more implementations of the embodiments, the livestreaming request carries a livestreaming identifier.

The proxy means 304 is further configured to:

determine the content delivery server corresponding to the livestreaming identifier based on the livestreaming identifier; and obtain the initial live video file from the content delivery server.

In the live video playback apparatus provided in this application, the specified player is generated when the user trigger operation is detected; the target live video file that is obtained by performing format conversion on the initial live video file and that is supported by the specified player is obtained, where the initial live video file is obtained from the content delivery server; and the target live video file is played in the specified player, where the playback state of the specified player is floating playback. The initial live video file is converted into the target live video file supported by the specified player, and the target live video file is played in the specified player. In this way, a live video is played by using the specified player, and because the specified player provides picture-in-picture playback, floating playback of the live video is implemented, thereby improving user experience. In addition, because the initial live video file is converted into the target live video file supported by the specified player, time and steps for format conversion are reduced, and disk space is saved.

The foregoing describes a schematic solution of the live video playback apparatus in the embodiments. It should be noted that the technical solution of the live video playback apparatus and the technical solution of the foregoing live video playback method belong to a same concept. For detailed content not described in detail in the technical solution of the live video playback apparatus, refer to the descriptions of the technical solution of the foregoing live video playback method.

Figure 4:
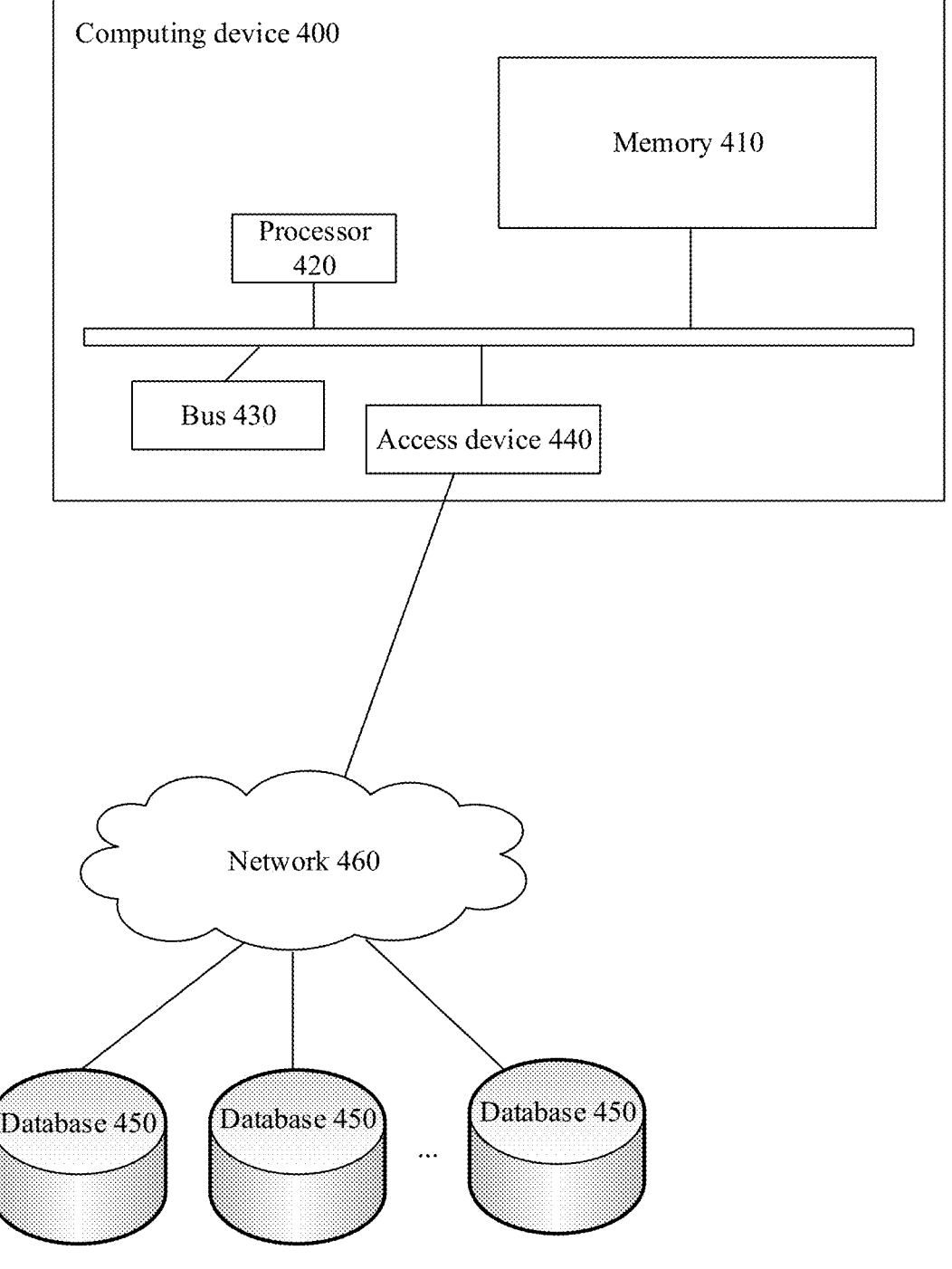
FIG. 4 is a block diagram of a structure of a computing device according to some embodiments of this application.

FIG. 4 is a block diagram of a structure of a computing device 400 according to some embodiments of this application. Components of the computing device 400 include but are not limited to a memory 410 and a processor 420. The processor 420 is connected to the memory 410 by using a bus 430. A database 450 is configured to store data.

The computing device 400 further includes an access device 440. The access device 440 enables the computing device 400 to perform communication by using one or more networks 460. Examples of these networks include a public switched telephone network (PSTN), a local area network (LAN), a wide area network (WAN), a personal area network (PAN), or a combination of communication networks such as the Internet. The access device 440 may include one or more of any type of wired or wireless network interface (for example, a network interface controller (NIC)), such as an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, or a near field communication (NFC) interface.

In some embodiments of this application, the foregoing components of the computing device 400 and other components not shown in FIG. 4 may be connected to each other, for example, through a bus. It should be understood that the block diagram of the structure of the computing device shown in FIG. 4 is merely used as an example instead of a limitation on the scope of this application. A person skilled in the art can add or replace other components based on a requirement.

The computing device 400 may be any type of stationary or mobile computing device, including a mobile computer or a mobile computing device (for example, a tablet computer, a personal digital assistant, a laptop computer, a notebook computer, or a netbook), a mobile phone (for example, a smart phone), a wearable computing device (for example, a smartwatch or smart glasses), or another type of mobile device, or a stationary computing device such as a desktop computer or a PC. The computing device 400 may alternatively be a mobile or stationary server.

The processor 420 implements the steps of the live video playback method when executing computer instructions.

The foregoing describes a schematic solution of the computing device in the embodiments. It should be noted that the technical solution of the computing device and the technical solution of the foregoing live video playback method belong to a same concept. For detailed content not described in detail in the technical solution of the computing device, refer to the descriptions of the technical solution of the foregoing live video playback method.

Some embodiments of this application further provide a computer-readable storage medium. The computer-readable storage medium stores computer instructions, and when the computer instructions are executed by a processor, the steps of the foregoing live video playback method are implemented.

The foregoing describes a schematic solution of the computer-readable storage medium in the embodiments. It should be noted that the technical solution of the storage medium and the technical solution of the foregoing live video playback method belong to a same concept. For detailed content not described in detail in the technical solution of the storage medium, refer to the descriptions of the technical solution of the foregoing live video playback method.

Some embodiments of this application provide a computer program. When the computer program is executed in a computer, the computer is enabled to perform the steps of the foregoing live video playback method.

The foregoing describes a schematic solution of the computer program in the embodiments. It should be noted that the technical solution of the computer program and the technical solution of the foregoing live video playback method belong to a same concept. For detailed content not described in detail in the technical solution of the computer program, refer to the descriptions of the technical solution of the foregoing live video playback method.

The foregoing describes specific embodiments of this application. Other embodiments fall within the scope of the appended claims. In some cases, actions or steps recorded in the claims may be performed in a sequence different from that in the embodiments and desired results may still be achieved. In addition, processes depicted in the accompanying drawings do not necessarily require a specific sequence or a sequential order shown to achieve the desired results. In some implementations, multitasking and parallel processing are also possible or may be advantageous.

The computer instructions include computer program code, and the computer program code may be in a source code form, an object code form, an executable file form, an intermediate form, or the like. The computer-readable medium may include: any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like.

It should be noted that, for ease of description, the foregoing method embodiments are described as a combination of a series of actions. However, a person skilled in the art should understand that this application is not limited to the described action sequence, because according to this application, some steps may be performed in another sequence or simultaneously. In addition, a person skilled in the art should also be aware that the embodiments described in this application are all preferred embodiments, and used actions and means are not necessarily mandatory to this application.

In the foregoing embodiments, the descriptions of the embodiments have respective focuses. For a part that is not described in detail in an embodiment, refer to related descriptions in other embodiments.

The preferred embodiments of this application disclosed above are merely intended to help describe this application. In the optional embodiments, not all details are described in detail, and this application is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is only subject to the claims and a full scope and equivalents thereof.

What is claimed is:

1. A method, comprising:

generating a specified player when a user trigger operation is detected, wherein the user trigger operation is an operation that a user returns back to a desktop of a client or switches to another application;

performing slicing and format conversion processing on an initial live video file to obtain at least one target live video slice file supported by the specified player, wherein the initial live video file is obtained from a content delivery server, and wherein the performing slicing and format conversion processing on the initial live video file to obtain at least one target live video slice file supported by the specified player comprises:

performing slicing and format conversion processing on the initial live video file based on an attribute information of at least one specified live video slice file in a pre-generated specified playlist file, to generate the at least one specified live video slice file that is in a one-to-one correspondence with the attribute information of the at least one specified live video slice file and that is supported by the specified player;

obtaining a target live video file constituted by the at least one target live video slice file and supported by the specified player; and playing the target live video file in the specified player, wherein a playback state of the specified player is floating playback.

2. The method according to claim 1, before playing the target live video file in the specified player, the method further comprising:

obtaining attribute information of target live video slice files in the target live video file, and generating a target playlist file based on the attribute information of the target live video slice files; and generating a slice file obtaining request in the specified player based on the attribute information of the target live video slice files in the target playlist file; and the playing the target live video file in the specified player comprises:

playing the at least one target live video slice file in the specified player based on the slice file obtaining request.

3. The method according to claim 2, wherein the generating the target playlist file based on the attribute information of the target live video slice files comprises:

adding the attribute information of the target live video slice files to a preset initial playlist file in a slice sequence, to obtain the target playlist file.

4. The method according to claim 2, wherein the slice file obtaining request comprises at least one slice file obtaining subrequest;

the generating the slice file obtaining request in the specified player based on the attribute information of the target live video slice files in the target playlist file comprises:

generating, starting from the first target live video slice file in the target playlist file, a current slice file obtaining subrequest in the specified player based on attribute information of a current target live video slice file in the target playlist file, wherein the target live video slice file is in a one-to-one correspondence with the slice file obtaining subrequest; and the playing the at least one target live video slice file in the specified player based on the slice file obtaining request comprises:

playing the current target live video slice file in the specified player based on the current slice file obtaining subrequest.

5. The method according to claim 1, wherein the playing the target live video file in the specified player comprises:

generating a slice file obtaining request in the specified player based on the attribute information of the at least one specified live video slice file in the pre-generated specified playlist file; and playing the at least one specified live video slice file in the specified player based on the slice file obtaining request.

6. The method according to claim 5, wherein the slice file obtaining request comprises at least one slice file obtaining subrequest;

the generating the slice file obtaining request in the specified player based on the attribute information of the at least one specified live video slice file in the pre-generated specified playlist file comprises:

generating, starting from the first specified live video slice file in the pre-generated specified playlist file, a current slice file obtaining subrequest in the specified player based on attribute information of a current specified live video slice file in the pre-generated specified playlist file, wherein the specified live video slice file is in a one-to-one correspondence with the slice file obtaining subrequest; and the playing the at least one specified live video slice file in the specified player based on the slice file obtaining request comprises:

playing the current specified live video slice file in the specified player based on the current slice file obtaining subrequest.

7. The method according to claim 1, before obtaining the target live video file supported by the specified player, the method further comprising:

obtaining the initial live video file from the content delivery server based on a livestreaming request triggered by the specified player.

8. The method according to claim 7, wherein the livestreaming request carries a livestreaming identifier; and the obtaining the initial live video file from the content delivery server based on the livestreaming request triggered by the specified player comprises:

determining the content delivery server corresponding to the livestreaming identifier based on the livestreaming identifier; and obtaining the initial live video file from the content delivery server.

9. A computing device, comprising:

one or more processors; and a memory, storing one or more programs configured to be executed by the one or more processors, the one or more programs comprising instructions for:

generating a specified player when a user trigger operation is detected, wherein the user trigger operation is an operation that a user returns back to a desktop of a client or switches to another application;

performing slicing and format conversion processing on an initial live video file to obtain at least one target live video slice file supported by the specified player, wherein the initial live video file is obtained from a content delivery server, and wherein the performing slicing and format conversion processing on the initial live video file to obtain at least one target live video slice file supported by the specified player comprises:

performing slicing and format conversion processing on the initial live video file based on an attribute information of at least one specified live video slice file in a pre-generated specified playlist file, to generate the at least one specified live video slice file that is in a one-to-one correspondence with the attribute information of the at least one specified live video slice file and that is supported by the specified player;

obtaining a target live video file constituted by the at least one target live video slice file and supported by the specified player; and playing the target live video file in the specified player, wherein a playback state of the specified player is floating playback.

10. The computing device according to claim 9, wherein the one or more programs further comprise instructions for:

before playing the target live video file in the specified player, obtaining attribute information of target live video slice files in the target live video file, and generating a target playlist file based on the attribute information of the target live video slice files; and generating a slice file obtaining request in the specified player based on the attribute information of the target live video slice files in the target playlist file; and the playing the target live video file in the specified player comprises:

playing the at least one target live video slice file in the specified player based on the slice file obtaining request.

11. The computing device according to claim 10, wherein the generating the target playlist file based on the attribute information of the target live video slice files comprises:

adding the attribute information of the target live video slice files to a preset initial playlist file in a slice sequence, to obtain the target playlist file.

12. The computing device according to claim 10, wherein the slice file obtaining request comprises at least one slice file obtaining subrequest;

the generating the slice file obtaining request in the specified player based on the attribute information of the target live video slice files in the target playlist file comprises:

generating, starting from the first target live video slice file in the target playlist file, a current slice file obtaining subrequest in the specified player based on attribute information of a current target live video slice file in the target playlist file, wherein the target live video slice file is in a one-to-one correspondence with the slice file obtaining subrequest; and the playing the at least one target live video slice file in the specified player based on the slice file obtaining request comprises:

playing the current target live video slice file in the specified player based on the current slice file obtaining subrequest.

13. The computing device according to claim 9, wherein the playing the target live video file in the specified player comprises:

generating a slice file obtaining request in the specified player based on the attribute information of the at least one specified live video slice file in the pre-generated specified playlist file; and playing the at least one specified live video slice file in the specified player based on the slice file obtaining request.

14. The computing device according to claim 13, wherein the slice file obtaining request comprises at least one slice file obtaining subrequest;

the generating the slice file obtaining request in the specified player based on the attribute information of the at least one specified live video slice file in the specified playlist file comprises:

generating, starting from the first specified live video slice file in the pre-generated specified playlist file, a current slice file obtaining subrequest in the specified player based on attribute information of a current specified live video slice file in the pre-generated specified playlist file, wherein the specified live video slice file is in a one-to-one correspondence with the slice file obtaining subrequest; and the playing the at least one specified live video slice file in the specified player based on the slice file obtaining request comprises:

playing the current specified live video slice file in the specified player based on the current slice file obtaining subrequest.

15. The computing device according to claim 9, wherein the one or more programs further comprise instructions for:

before obtaining the target live video file supported by the specified player, obtaining the initial live video file from the content delivery server based on a livestreaming request triggered by the specified player.

16. A non-transitory computer-readable storage medium, wherein the non-transitory computer-readable storage medium stores one or more programs comprising instructions that, when executed by one or more processors of a computing device, cause the computing device to perform operations comprising:

generating a specified player when a user trigger operation is detected, wherein the user trigger operation is an operation that a user returns back to a desktop of a client or switches to another application;

performing slicing and format conversion processing on an initial live video file to obtain at least one target live video slice file supported by the specified player, wherein the initial live video file is obtained from a content delivery server, and wherein the performing slicing and format conversion processing on the initial live video file to obtain at least one target live video slice file supported by the specified player comprises:

performing slicing and format conversion processing on the initial live video file based on an attribute information of at least one specified live video slice file in a pre-generated specified playlist file, to generate the at least one specified live video slice file that is in a one-to-one correspondence with the attribute information of the at least one specified live video slice file and that is supported by the specified player;

obtaining a target live video file constituted by the at least one target live video slice file and supported by the specified player; and playing the target live video file in the specified player, wherein a playback state of the specified player is floating playback.

* * * * *